US007718068B2

(12) United States Patent
Miller, III

(10) Patent No.: US 7,718,068 B2
(45) Date of Patent: May 18, 2010

(54) WASTEWATER TREATMENT SYSTEM AND PROCESS UTILIZING SOLIDS BASED BACTERIAL COLONIZATION (SBBC)

(76) Inventor: Herman P. Miller, III, P.O. Box 2964, Yountville, CA (US) 94599

( * ) Notice: Subject to any disclaimer, the term of this patent is extended or adjusted under 35 U.S.C. 154(b) by 1 day.

(21) Appl. No.: 12/194,003

(22) Filed: Aug. 19, 2008

(65) Prior Publication Data
US 2010/0044305 A1 Feb. 25, 2010

(51) Int. Cl.
*C02F 3/12* (2006.01)
(52) U.S. Cl. .................. 210/616; 210/625; 210/151; 210/173; 210/195.3
(58) Field of Classification Search .............. 210/615, 210/616, 623, 625, 626, 150, 151, 173, 195.1, 210/195.3
See application file for complete search history.

(56) References Cited

U.S. PATENT DOCUMENTS 3,806,448 A * 4/1974 Smith .................. 210/625
4,200,524 A * 4/1980 Levin .................. 210/616
4,500,429 A * 2/1985 Reimann et al. ............ 210/616
5,151,187 A * 9/1992 Behmann .................. 210/151
5,302,288 A * 4/1994 Meidl et al. .............. 210/616
5,310,484 A * 5/1994 Berrigan, Jr. .............. 210/616
5,658,458 A * 8/1997 Keyser et al. ............ 210/195.1
6,291,232 B1 9/2001 Miller, III
6,632,362 B2 10/2003 Miller, III
6,790,359 B2 9/2004 Miller, III
6,942,798 B2 9/2005 Miller, III

* cited by examiner

*Primary Examiner*—Christopher Upton
(74) *Attorney, Agent, or Firm*—Edward S. Wright

(57) ABSTRACT

Wastewater treatment system and process in which the influent is passed through a mixing chamber and then through a series of filters of progressively smaller size to separate the materials carrying the colonized bacteria from finer solids in the influent and separate the materials according to size. The materials from the filters are progressively reduced to a smaller size, the materials of smaller size are returned to the mixing chamber, and new influent is inoculated with the colonized bacteria carried by the materials returned to the mixing chamber.

12 Claims, 2 Drawing Sheets

WASTEWATER TREATMENT SYSTEM AND PROCESS UTILIZING SOLIDS BASED BACTERIAL COLONIZATION (SBBC)

BACKGROUND OF THE INVENTION

1. Field of Invention

This invention pertains generally to wastewater treatment and, more particularly, to a wastewater treatment system and process which utilize foreign substances in the influent stream.

2. Related Art

Large quantities of fecal matter can cling to foreign materials such as rags, condoms, diapers, unprocessed garbage, whole fruits and vegetables from canneries, sand, first-sized rocks and lumber that come floating, tumbling and sliding into the headworks of wastewater treatment plants. Such materials must be removed from the influent stream to prevent them from clogging up the system or bogging down the treatment process. The fecal matter stays with the materials when they are removed, and with the pathogens and possible viruses in the fecal matter, it presents a serious health hazard to the people who are involved in the removal, transportation and disposal of the materials.

In larger cities where sewage travels several miles to treatment facilities or where collection systems are such that flow rates are slow, bacterial growth can be deeply colonized into every crack and crevice in the materials, and rags and other porous materials are often densely packed with fecal matter that is well colonized with bacteria and quite putrid.

The foreign materials are removed by a wide variety of means and commonly transported to the local garbage dump, landfill, or incinerator. A plant that processes 10 million gallons per day can, for example, accumulate several cubic yards of such material every day. In addition to the health hazard, the removal, transportation, placement or spreading of the foreign materials consumes large amounts of energy and accounts for a large percentage of total plant operating costs. Moreover, the open aerobic digestion of the fecal material produces gasses that contribute to the greenhouse effect.

OBJECTS AND SUMMARY OF THE INVENTION

It is in general an object of the invention to provide a new and improved wastewater treatment system and process.

Another object of the invention is to provide a system and process of the above character which utilize the decomposition and hydrolyzing effect, of colonized bacteria which cling to foreign materials on the biosolid components in the influent stream.

These and other objects are achieved in accordance with the invention by providing a wastewater treatment system and process in which the influent is passed through a mixing chamber and then through a separator to separate the material carrying the colonized bacteria from the finer solids and/or major liquid component in the influent, the material carrying the colonized bacteria is returned to the mixing chamber, and the material carrying the colonized bacteria is mixed with new influent in the mixing chamber so the bacteria can inoculate the new influent while the clarified liquid component is either passed along to standard settling tanks or clarifiers, chlorinated, or discharged as pure water depending upon the extent of purification designed into the system's own filtration system.

DETAILED DESCRIPTION

In the invention, a mixing chamber through which all influent must flow is provided at the influent input of a wastewater treatment plant. At the output of the mixing chamber, a separator or series of separators remove the solids which are permeated with colonized bacteria from the influent waters by the use of progressively smaller series of screens or membranes. The removed solids are fed to a series of smaller and smaller shredders, crushers, and/or grinders and are returned to the upstream side of the mixing chamber in which they will in turn colonize the bacteria in the influent stream, bringing more dissolved solids out of solution and increasing the suspended solids available to the subsequent finer separator or primary sedimentation process.

Figure 1:
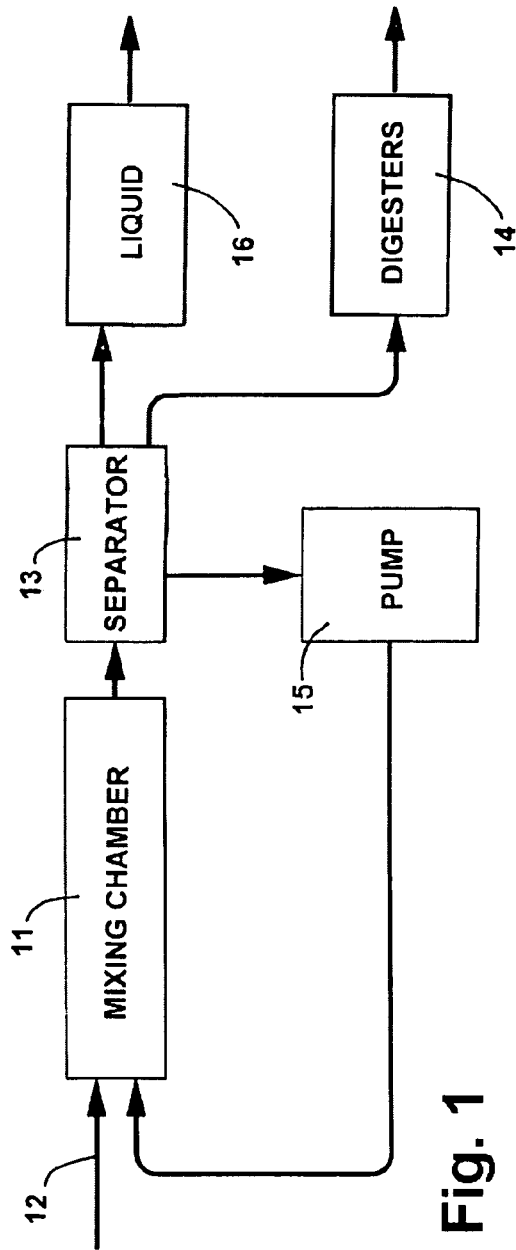
FIG. 1 is a block diagram of one embodiment of a wastewater treatment system according to the invention.

In the embodiment illustrated in FIG. 1, the system includes a mixing chamber 11 to which the influent stream 12 of a wastewater treatment plant is fed. The flow from the mixing chamber goes to a separator 13 where large foreign objects or plastic media are separated from the flow, along with the biosolid bacterial colonization, or fecal matter, attached thereto. From the separator, fine solids are delivered to the digesters 14 of the treatment plant, the larger, colonized materials go to a pump or conveyor 15 which returns them to the mixing chamber, and the major liquid component 16 is delivered to primary sedimentation. The digesters can, for example, be anaerobic digesters of the type disclosed in U.S. Pat. Nos. 6,291,232, 3,790,359, 6,632,362, and 6,942,798, the disclosures of which are incorporated herein.

In the mixing chamber, the colonized materials from the separator mix with new materials from the influent stream and inoculate the new materials with the bacteria they carry. The mixture then flows to the separator where the larger materials are once again removed and returned to the mixing chamber, and the inoculated waste stream and finer solids continue on to the digesters, while the somewhat clarified liquid continues on to the standard process.

Figure 2:
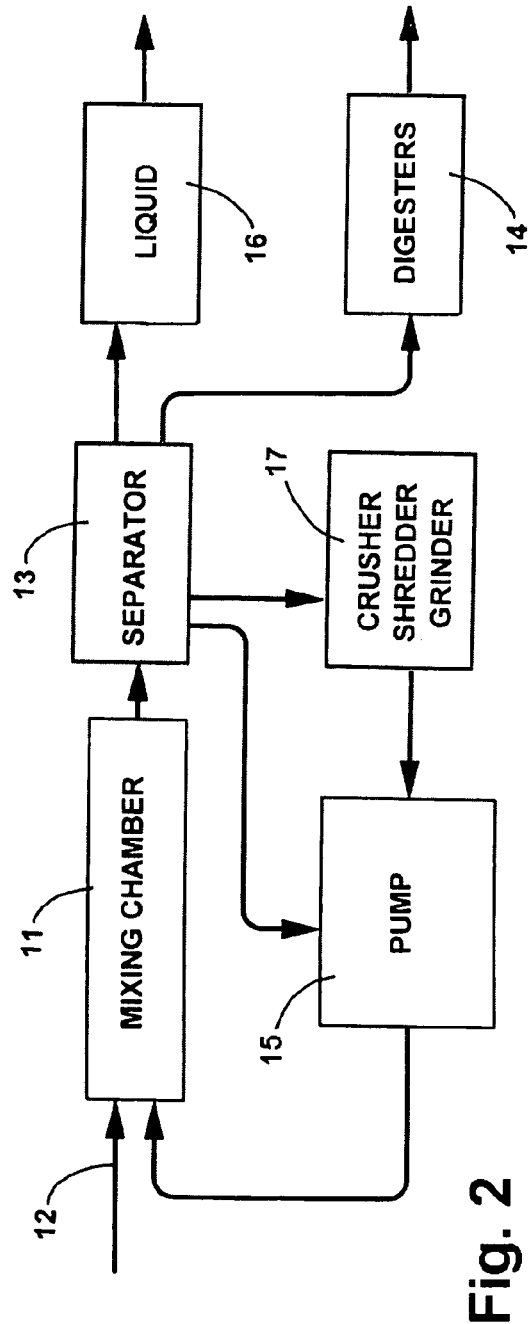
FIG. 2 is block diagram of another embodiment of a wastewater treatment system according to the invention.

In the embodiment of FIG. 2, the system is enhanced with a two-stage separator 13 together with a crusher, shredder, or grinder 17 for reducing the size of the larger materials. The separator has a fine solid output which goes to the digester, a medium solid output which goes to pump 15, and a large solid output which goes to the crusher 17, while the clarified liquid component continues on to further processing. The output of the crusher goes to the pump 15 and then back to the mixing chamber.

Operation and use of this embodiment is similar to that of FIG. 1 except that the materials with the colonized bacteria are separated by size, with the larger materials going to the crusher where they are reduced in size and the smaller materials going directly to the pump. As in the embodiment of FIG. 1, the bacterial colonization carried by materials returned to the mixing chamber inoculates the new influent, and the inoculated influent is delivered to the digesters, while larger materials are returned to the crusher and the mixing chamber.

Figure 3:
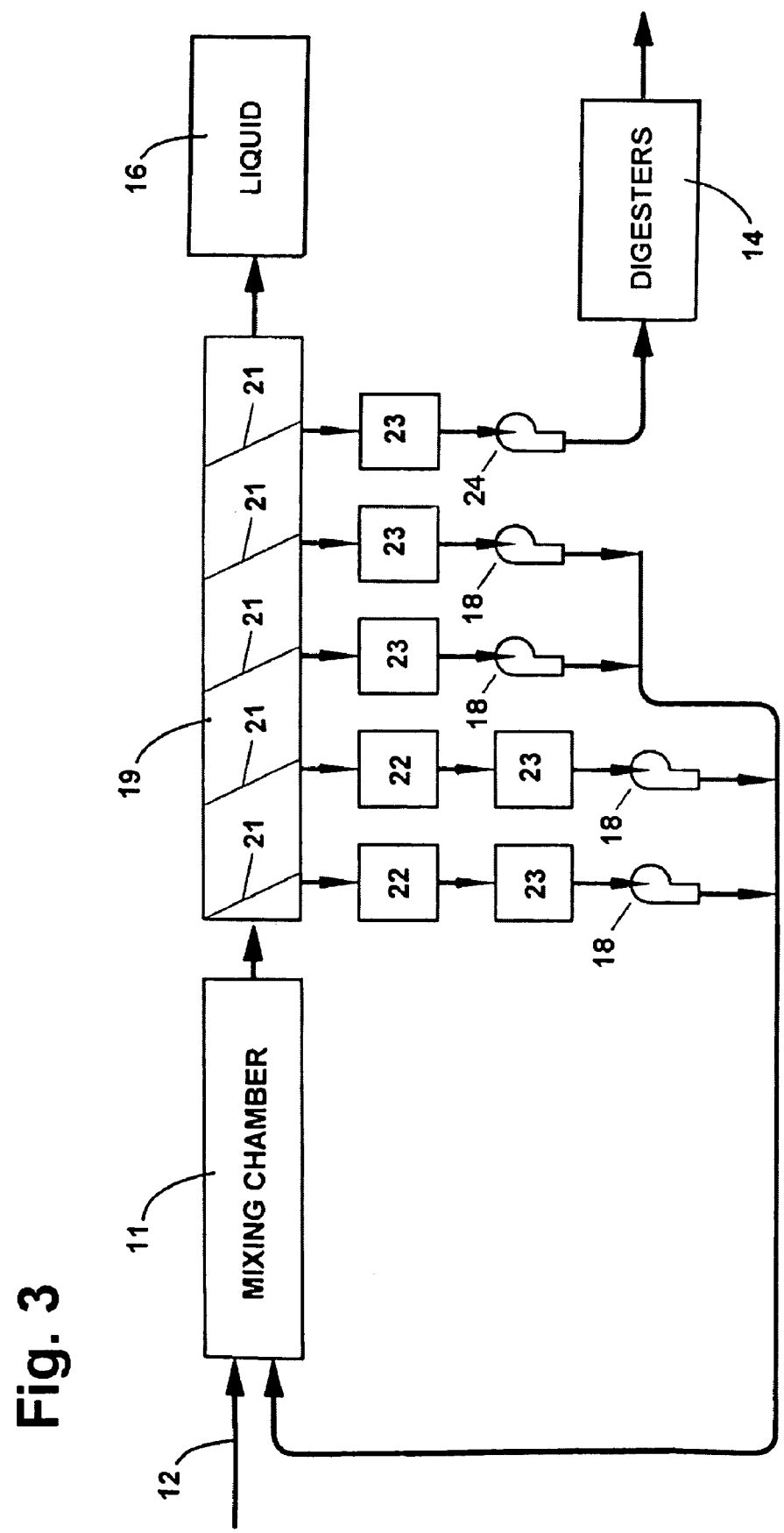
FIG. 3 is a block diagram of another embodiment of a wastewater treatment system according to the invention.

In the embodiment of FIG. 3, the output of mixing chamber 11 goes to a separator in the form of a filter rack 19 which has a series of screens and filters 21 of progressively smaller or finer size. The output of each of the larger screens goes to a crusher or shredder 22 and then to a grinder 23, while the outputs of the smaller screens go directly to grinders. Pumps 18 return the material from the grinders to the mixing chamber, and pump 24 delivers the output from the finest screen to digesters 14.

In this embodiment, the crushers or shredders reduce the size of the larger materials, and the grinders produce a slurry of thick solids which is delivered to mixing chamber 11 where it inoculates incoming biomass as it flows to the filter screens. The fine suspended biosolids passing through the filters are delivered to digesters 14 for further treatment, and the clear liquid or water, depending upon the filter membrane sizing, is passed along to storage 16 or its intended utilization.

If desired, a conveyor such as a belt conveyor or a screw conveyor can be used instead of a pump for returning the ground or crushed materials to the mixing chamber. Similarly, a single pump or conveyor can be used in combination with a hopper instead of the individual pumps in the embodiment of FIG. 3.

The invention has a number of important features and advantages. It makes use of the foreign substances found in influent streams which already abound in bacteria and are often highly colonized anaerobically and/or aerobically. By processing and concentrating such materials into a thick slurry and inoculating new influent with them, a much greater component of the volatile biosolids entering into the main plant process are heavier suspended solids in comparison to the dissolved component of same.

The concentrated slurry is preferably fed into the influent as far upstream as possible in order to enhance the colonization of the plant influent as highly as possible in the time allowed.

An unexpected feature of the invention is that in certain treatment systems, such as specialized commercial processes, the invention may support artificial plastic media and/or the addition of chemicals to obtain particular preconditioning requirements.

It is apparent from the foregoing that a new and improved wastewater treatment system and process have been provided. While only certain presently preferred embodiments have been described in detail, as will be apparent to those familiar with the art, certain changes and modifications can be made without departing from the scope of the invention as defined by the following claims.

The invention claimed is:

1. A system for the treatment of a wastewater influent which includes material carrying colonized bacteria, comprising: a mixing chamber to which the influent is fed, a separator having a series of filters of progressively smaller sizes for receiving the influent from the mixing chamber and separating the material carrying the colonized bacteria from finer solids in the influent, and means for returning the material carrying the colonized bacteria to the mixing chamber so that the bacteria can inoculate new influent in the mixing chamber.

2. The system of claim 1 including means for reducing the size of the material carrying the colonized bacteria before the material is returned to the mixing chamber.

3. The system of claim 2 wherein the means for reducing the size of the material carrying the colonized bacteria is selected from the group consisting of a crusher, a shredder, a grinder, and combinations thereof.

4. The system of claim 1 including means for progressively reducing the size of the materials from the filters to form a thick slurry of material carrying the colonized bacteria for return to the mixing chamber.

5. A process for the treatment of a wastewater influent which includes material carrying colonized bacteria, comprising the steps of: passing the influent through a mixing chamber and then through a separator having a series of filters of progressively smaller sizes to separate the material carrying the colonized bacteria from the finer solids in the influent and to further separate the material carrying the colonized bacteria into materials of different sizes, returning the materials carrying the colonized bacteria to the mixing chamber, and mixing the materials carrying the colonized bacteria with new influent in the mixing chamber so the bacteria can inoculate the new influent.

6. The process of claim 5 including the step of reducing the size of the materials carrying the colonized bacteria before the materials are returned to the mixing chamber.

7. The process of claim 6 wherein the size of the materials carrying the colonized bacteria is reduced by a process selected from the group consisting of crushing, shredding, grinding, and combinations thereof.

8. The process of claim 5 including the step of progressively reducing the size of the materials from the filters to form a thick slurry of material carrying the colonized bacteria which is returned to the mixing chamber.

9. A system for the treatment of a wastewater influent which includes materials carrying colonized bacteria, comprising: a mixing chamber to which the influent is fed, a series of filters of progressively smaller size to which the influent is fed from the mixing chamber for separating the materials carrying the colonized bacteria from finer solids in the influent and separating the materials according to size, means for progressively reducing materials from the filters to a smaller size, and means for returning the materials of smaller size to the mixing chamber so that the colonized bacteria carried by the materials can inoculate new influent in the mixing chamber.

10. The system of claim 9 wherein the means for reducing materials from the filters to a smaller size is selected from the group consisting of crushers, shredders, grinders, and combinations thereof.

11. A process for the treatment of a wastewater influent which includes material carrying colonized bacteria, comprising the steps of: passing the influent through a mixing chamber, feeding the influent from the mixing chamber through a series of filters of progressively smaller size to separate the materials carrying the colonized bacteria from finer solids in the influent and separate the materials according to size, progressively reducing materials from the filters to a smaller size, returning the materials of smaller size to the mixing chamber, and inoculating new influent with the colonized bacteria carried by the materials returned to the mixing chamber.

12. The process of claim 11 wherein the materials from the filters are progressively reduced to a smaller size by a process selected from the group consisting of crushing, shredding, grinding, and combinations thereof.

\* \* \* \* \*